Patented July 21, 1936

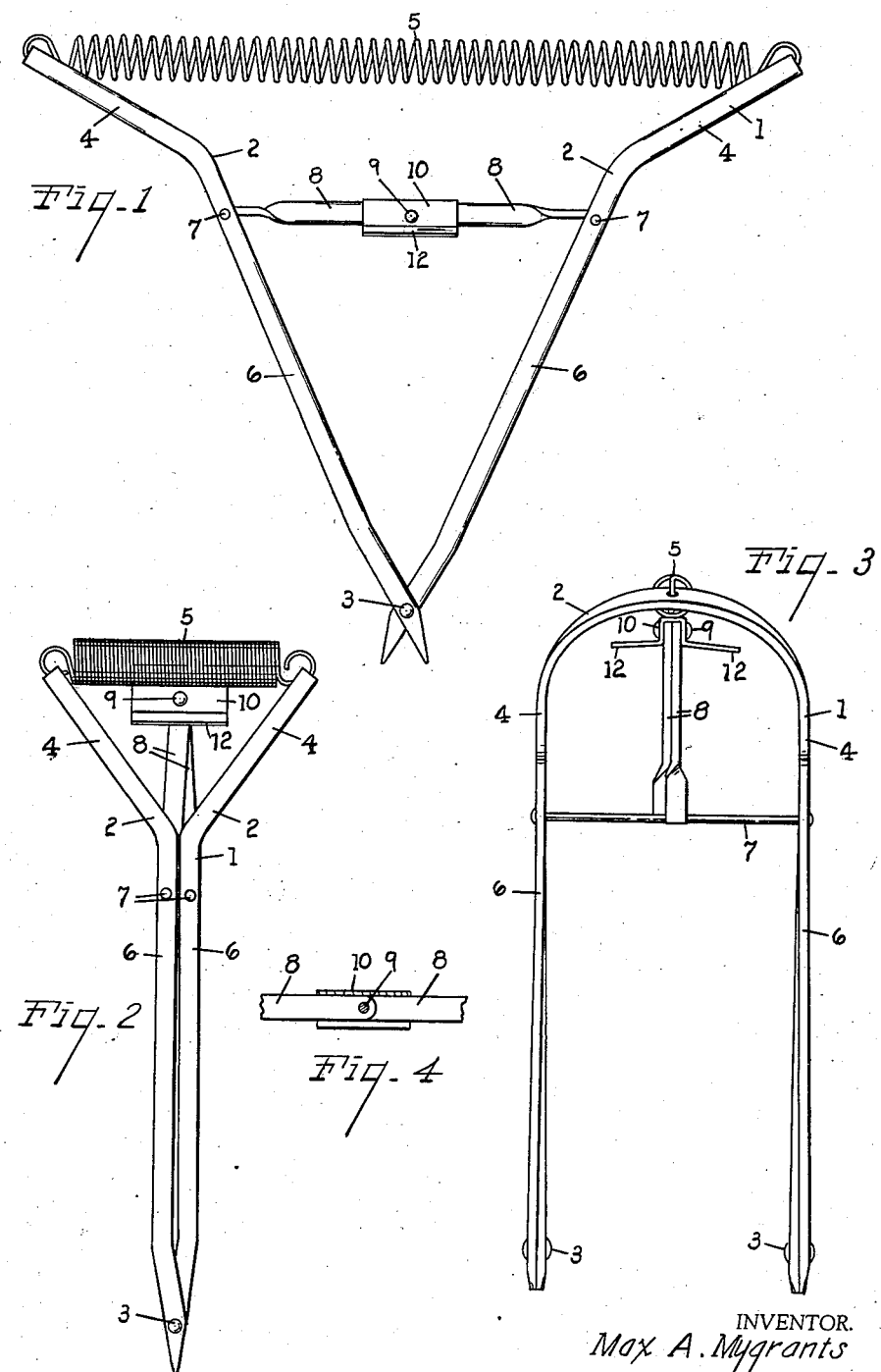

2,048,135

UNITED STATES PATENT OFFICE 2,048,135

MOLE TRAP

Max A. Mygrants, Jackson, Mich.

Application March 2, 1935, Serial No. 9,050

10 Claims. (Cl. 43—94)

The main objects of this invention are:

First, to provide an improved mole trap which is simple and economical in its parts and very efficient and effective in operation.

Second, to provide a mole trap of the foregoing character which is easy to set, the setting of the trap acting to break a closing path for the jaws when the trap is sprung.

Objects relating to details and economies of my invention will appear from the description to follow. The invention is defined and pointed out in the claims.

A structure which is a preferred embodiment of my invention is illustrated in the accompanying drawing, in which:

Fig. 1 is a view in front elevation of a mole trap embodying features of my invention, the trap being shown in open or set position.

Fig. 2 is a similar view of the trap in sprung or closed position.

Fig. 3 is a view in side elevation.

Fig. 4 is a fragmentary view partially in section and partially in front elevation of the joint or toggle connecting the setting links.

Referring to the drawing, 1 in general is a mole trap comprising a pair of inverted rear bail-shaped jaw members 2 pivoted together at 3 near their lower ends and having diverging upper end portions 4. A coiled tension spring 5 is connected at its ends to the tops of the jaw members and acts to urge them to closed position.

The arms 6 of the jaw members are connected by cross bars 7 arranged below the upper end portions 4, the cross bars being rotatable relative to the arms. To these cross bars I connect a pair of toggle links 8, the links being thus pivoted at their outer ends to the jaw members and having a common joint provided with a pivot 9. On the common joint I dispose a member 10 of inverted U cross section having its sides engaged by the pivot 9, the member 10 being adapted to lock the jaw members in open position against the tension of spring 5 when the common joint of the links is moved below the center line of the pivots at the outer ends of the links.

The member 10 is provided with laterally projecting flanges 12 at its sides constituting a pan adapted to be pushed up by the mole to move the joint above the center line of the outer link pivots and spring the trap. The arms 6 of the jaw members below the cross bars 7 and above the pivots 3 constitute the jaws of the trap which close on the mole with a clamping action when the trap is sprung.

In use, the trap 1 with the parts in closed position as shown by Fig. 2 is pushed into the ground in line with the run-way of the mole. The jaw members are then swung outwardly and the member 10 is depressed until the parts are locked with the trap in set position as shown by Fig. 1. With the trap set, the pan or joint of the toggle should lie above the mole run-way to be pushed up by the mole as it passes through the run-way. When the trap is sprung the mole is killed by the closing of the jaws 6.

It will be noted that when the jaws are closed they do not shear past each other and they are shaped so that a space is left between the jaws. The purpose of this is to assist in holding a mole if caught by the foot or nose; that is, it would not shear off the member or completely sever the mole. The arms of the jaw members are bent outwardly at a point above their lower extremity and gradually slope inwardly to a point of contact near the cross bars.

From the foregoing description of my invention, it will be apparent to those skilled in the art that I provide a mole trap which is simple and economical in its parts and very easy to set. Further, my trap is very effective for the purpose intended and dispatches the mole, when caught, in a humane manner.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent is:

1. A mole trap comprising a pair of bail-shaped jaw members pivoted together at their lower ends and having diverging upper end portions, a coiled tension spring connected at its ends to the tops of said jaw members and acting to urge them to closed position, cross bars journaled to the arms of said jaw members below said upper end portions, a pair of links connected at their outer ends to said cross bars and having a common joint provided with a pivot, and a member of inverted U cross section on said joint having its sides engaged by said pivot, said member being adapted to lock said jaw members in open position against the tension of said spring when the joint of said links is moved below the center line of the pivots at the outer ends of the links, said member being provided with lateral flanges at its sides adapted to be pushed up by the mole to move said joint above said center line and spring the trap, the arms of the jaw members below said cross bars and above their pivoted lower ends constituting the jaws of the trap which close on the mole with a clamping action when the trap is sprung.

2. A mole trap comprising a pair of bail-shaped jaw members pivoted together at their lower ends and having diverging upper end portions, a coiled tension spring connected at its ends to said jaw members and acting to urge them to closed position, cross bars journaled to the arms of said jaw members below said upper end portions, a pair of links connected at their outer ends to said cross bars and having a common joint provided with a pivot, and a member on said joint engaged by said pivot, said member being adapted to lock said jaw members in open position against the tension of said spring when the joint of said links is moved below the center line of the pivots at the outer ends of the links, said member being adapted to be pushed up by the mole to move said joint above said center line and spring the trap, the arms of the jaw members below said cross bars and above their pivoted lower ends constituting the jaws of the trap.

3. A mole trap comprising a pair of yoke-like jaw members pivoted together at their lower ends, spring means acting to urge said jaw members to closed position, a pair of links pivoted at their outer ends to said jaw members and having a common joint, and a member of inverted U cross section pivoted on said joint, said member being adapted to lock said jaw members in open position against the tension of said spring means when the joint of said links is moved below the center line of the pivots at the outer ends of the links, said member being provided with a pan extension adapted to be pushed up by the mole to move said joint above said center line and spring the trap, the arms of the jaw members below said links and above their pivoted lower ends constituting the jaws of the trap which close on the mole with a clamping action when the trap is sprung.

4. A mole trap comprising a pair of yoke-like jaw members pivoted together at their lower ends, spring means acting at the upper ends of said jaw members to urge said jaw members to closed position, a pair of links pivoted at their outer ends to said jaw members and having a common joint, and a member of inverted U cross section pivoted on said joint, said member being adapted to lock said jaw members in open position against the tension of said spring means when the joint of said links is moved below the center line of the pivots at the outer ends of the links.

5. A mole trap comprising a pair of yoke-like jaw members pivoted together at the ends of their arms, a coiled tension spring connected at its ends to the tops of said jaw members and acting to urge them to closed position, cross bars connecting the arms of said jaw members below said upper end portions, a pair of links connected at their outer ends to said cross bars and having a common joint, and a member of inverted U cross section on said joint, said member being adapted to lock said jaw members in open position against the tension of said spring when the joint of said links is moved below the center line of the pivots at the outer ends of the links, said member being provided with lateral flanges at its sides adapted to be pushed up by the mole to move said joint above said center line and spring the trap, the arms of the jaw members below said cross bars and above their pivoted lower ends constituting the jaws of the trap which close on the mole with a clamping action when the trap is sprung.

6. A mole trap comprising a pair of yoke-like jaw members pivoted together at the ends of their arms, a coiled tension spring connected at its ends to said jaw members and acting to urge them to closed position, cross bars connecting the arms of said jaw members below said upper end portions, a pair of links connected at their outer ends to said cross bars and having a common joint, and means acting to lock said jaw members in open position against the tension of said spring when the joint of said links is moved below the center line of the pivots at the outer ends of the links, said means being adapted to be pushed up by the mole to move said joint above said center line and spring the trap, the arms of the jaw members below said cross bars and above their pivoted lower ends constituting the jaws of the trap which close on the mole with a clamping action when the trap is sprung.

7. A mole trap comprising a pair of inverted U-shaped jaw members having their lower ends offset inwardly and disposed in overlapping crossed relation downwardly, their tips being tapered, pivots connecting the overlapping end portions of the arms, the bight portions of the jaw members being outwardly offset, a spring connecting the outwardly offset bight portions of the arms and acting to collapse the jaw members, and a locking toggle comprising a pair of toggle members pivotally connected to each other and pivotally connected to said jaw members and acting to hold them in set relation when the toggle is extended, said toggle having a tripping pan carried by the pivot thereof.

8. A mole trap comprising a pair of inverted U-shaped jaw members having their lower ends offset inwardly and disposed in overlapping crossed relation downwardly, pivots connecting the overlapping end portions of the arms, a spring connecting the bight portions of the arms and acting to collapse the jaw members, and a locking toggle comprising a pair of toggle members pivotally connected to each other and pivotally connected to said jaw members and acting to hold them in set relation when the toggle is extended.

9. In a mole trap, the combination of a pair of bail-like jaw members having the lower ends of their arms disposed in overlapping relation and pivotally connected, a spring connected to the upper ends of said jaw members and acting to collapse the same, and an upwardly breaking toggle disposed in substantially spaced relation from the pivot connections for the arms of said jaw members and adapted to be broken by an upward thrust on the under side thereof to permit the spring to close the jaws.

10. In a mole trap, the combination of a pair of bail-like jaw members having the lower ends of their arms disposed in overlapping relation and pivotally connected, the arms being offset outwardly above the pivots so that they are spaced for a substantial distance when the jaws are closed, a spring connecting the upper ends of the jaw members and acting to collapse the same, and an upwardly breaking toggle for holding the jaws in set position, disposed in substantially spaced relation from the pivot connection of the arms of the jaw members, and adapted to be broken by an upward thrust on the underside thereof to permit the spring to close the jaws.

MAX A. MYGRANTS.